United States Patent
Green et al.

(10) Patent No.: US 10,428,571 B2
(45) Date of Patent: Oct. 1, 2019

(54) BOOT LID

(71) Applicant: BENTLEY MOTORS LIMITED, Cheshire (GB)

(72) Inventors: Gary David Green, Cheshire (GB); Steve Crowe, Cheshire (GB); Andreas Lange, Nantwich (GB); David Molyneux, Cheshire (GB); Paul Wentworth, Staffordshire (GB)

(73) Assignee: Bentley Motors Limited, Crewe, Cheshire (GB)

(*) Notice: Subject to any disclaimer, the term of this patent is extended or adjusted under 35 U.S.C. 154(b) by 127 days.

(21) Appl. No.: 15/542,074

(22) PCT Filed: Dec. 22, 2015

(86) PCT No.: PCT/GB2015/054118
§ 371 (c)(1),
(2) Date: Jul. 6, 2017

(87) PCT Pub. No.: WO2016/110670
PCT Pub. Date: Jul. 14, 2016

(65) Prior Publication Data
US 2018/0274280 A1 Sep. 27, 2018

(30) Foreign Application Priority Data
Jan. 6, 2015 (GB) .................................. 1500096.1

(51) Int. Cl.
*E05F 15/63* (2015.01)
*E05F 15/622* (2015.01)
*B60R 5/04* (2006.01)

(52) U.S. Cl.
CPC ................ *E05F 15/63* (2015.01); *B60R 5/04* (2013.01); *E05F 15/622* (2015.01); *E05Y 2800/232* (2013.01); *E05Y 2900/548* (2013.01)

(58) Field of Classification Search
CPC ......... E05Y 2900/546; E05Y 2900/548; E05F 15/63; E05F 15/622; E05F 1/1091
See application file for complete search history.

(56) References Cited

U.S. PATENT DOCUMENTS 2,594,643 A * 4/1952 Gustisha ............... E05F 15/622
180/69.21
3,157,429 A * 11/1964 Harms ..................... B60J 7/205
296/76

(Continued)

FOREIGN PATENT DOCUMENTS

CA 2485052 A1 4/2005
EP 1154113 A2 11/2001

(Continued)

*Primary Examiner* — Justin B Rephann
(74) *Attorney, Agent, or Firm* — Schwabe Williamson & Wyatt, P.C.

(57) ABSTRACT

An automobile comprises an automatically opening and closing boot lid having a drive mechanism located on the dry side of the drain channel and a rotatable shaft extending into the wet side of the drain channel, in order to provide drive to an arm which opens and closes the boot lid. The drive mechanism may be a linear actuator, such as a spindle drive, but drive is transmitted through the drain channel as torque.

20 Claims, 4 Drawing Sheets

(56) References Cited

U.S. PATENT DOCUMENTS

| | | | | |
|---|---|---|---|---|
| 5,367,826 A * | 11/1994 | Wu | B61C 17/04 | 49/343 |
| 5,563,483 A * | 10/1996 | Kowall | E05B 81/14 | 318/266 |
| 6,454,339 B2 * | 9/2002 | Wilde | E05F 15/619 | 296/76 |
| 6,516,567 B1 * | 2/2003 | Stone | E05F 15/622 | 296/55 |
| 6,550,839 B2 * | 4/2003 | Rogers, Jr. | B60J 5/105 | 296/146.8 |
| 6,601,903 B2 * | 8/2003 | Nakagome | B62D 25/12 | 296/76 |
| 6,637,157 B1 * | 10/2003 | Dombrowski | E05F 15/619 | 49/340 |
| 6,669,268 B2 * | 12/2003 | Oberheide | E05F 15/622 | 296/146.8 |
| 6,676,190 B2 * | 1/2004 | Daniels | E05F 15/619 | 296/106 |
| 6,719,356 B2 * | 4/2004 | Cleland | E05F 1/1091 | 296/146.8 |
| 6,814,392 B1 * | 11/2004 | Tomaszewski | E05F 15/622 | 296/146.4 |
| 7,083,221 B2 * | 8/2006 | Hida | E05F 1/1091 | 296/146.8 |
| 7,243,976 B2 * | 7/2007 | Okada | E05F 15/619 | 296/146.4 |
| 7,370,905 B2 * | 5/2008 | Watanabe | E05F 15/63 | 296/146.1 |
| 7,517,003 B2 * | 4/2009 | Okada | E05F 15/619 | 296/146.1 |
| 8,042,301 B2 * | 10/2011 | Ritter | E05F 15/622 | 49/139 |
| 9,174,517 B2 * | 11/2015 | Scheuring | F16H 25/2015 | |
| 9,186,965 B2 * | 11/2015 | Lathwesen | B60J 5/107 | |
| 9,702,180 B2 * | 7/2017 | Im | E05F 15/614 | |
| 2002/0005650 A1 | 1/2002 | Rogers, Jr. | | |
| 2002/0180233 A1 | 12/2002 | Benthaus | | |
| 2003/0006622 A1 * | 1/2003 | Baik | E05F 1/1091 | 296/76 |
| 2004/0046418 A1 * | 3/2004 | Chikata | E05F 15/63 | 296/146.4 |
| 2004/0232723 A1 * | 11/2004 | Sera | E05F 15/70 | 296/146.8 |
| 2004/0256881 A1 * | 12/2004 | Takeda | E05F 15/63 | 296/146.2 |
| 2005/0150078 A1 | 7/2005 | Bittner | | |
| 2005/0168010 A1 * | 8/2005 | Cleland | E05F 1/1091 | 296/146.8 |
| 2006/0261626 A1 * | 11/2006 | Okada | E05F 15/611 | 296/76 |
| 2007/0209160 A1 * | 9/2007 | Darscheid | E05D 3/145 | 16/334 |
| 2007/0228763 A1 * | 10/2007 | Duffy | E05F 15/63 | 296/76 |
| 2009/0255185 A1 * | 10/2009 | Schachtl | E05D 5/062 | 49/334 |
| 2012/0000304 A1 * | 1/2012 | Hamminga | E05F 15/622 | 74/89.23 |
| 2017/0328450 A1 * | 11/2017 | Adams | E05F 15/616 | |

FOREIGN PATENT DOCUMENTS

| | | |
|---|---|---|
| EP | 1294585 | 1/2002 |
| EP | 1264956 A2 | 12/2002 |
| EP | 1898035 A2 | 3/2008 |
| JP | H0558163 A | 3/1993 |

* cited by examiner

BOOT LID

CROSS REFERENCE TO RELATED APPLICATIONS

The present application is a national phase entry under 35 U.S.C. § 371 of International Application No. PCT/GB2015/054118, filed Dec. 22, 2015, entitled "BOOT LID," which designated, among the various States, the United States of America, and which claims priority to GB 1500096.1 filed Jan. 6, 2015, both of which are hereby incorporated by reference.

TECHNICAL FIELD OF THE INVENTION

The present invention relates to an automobile boot lid and in particular an arrangement for powered opening and closing of an automobile boot lid.

BACKGROUND TO THE INVENTION

Powered boot lids allow a boot (also known as a "trunk") of an automobile to be opened and closed without effort.

For example, in certain luxury automobiles, the hinges which attach the boot lid to the automobile are each driven directly by an electric motor with a downstream toothed gear mechanism see e.g. US2005/0150078.

This technique has certain disadvantages. Depending on the gearing, the directly driven mechanism can require a large motor for a heavy boot lid, or can operate very slowly.

Powered struts, which are generally simpler and cheaper than powered hinges, have been proposed for opening and closing tailgates, but these tend to be heavier and bulkier than the mechanism discussed above. For example, WO2009/03143 discloses a drive device for displacing a motor vehicle side door, hatch door (or "tailgate") or trunk lid. Similarly, U.S. Pat. No. 8,403,397 discloses an adjustable tailgate support which preferably has an electric spindle drive. In WO2009/03143, a drive device is shown attached in the interior of the vehicle attached to one side of the vehicle, whereas in U.S. Pat. No. 8,403,397, supports are provided on both sides of the tailgate, and they are disposed in channels formed in the body between the interior and the exterior of the vehicle. Extension of these struts opens the tailgate/hatch door, which opens in an arc about the hinges, swinging outward then upward.

Certain disadvantages are associated with these arrangements, in which one part telescopes out of another in areas which are exposed to the environment. Specifically, dirt/dust/water can accumulate on the struts and can be detrimental to the operation of the struts, also dirty grease from struts can be transferred to items placed in the boot-space.

The struts are visible in use and can potentially obstruct attempts to put items inside the boot-space. Moreover the mechanism is exposed during opening/closing and therefore can be noisy.

SUMMARY OF THE INVENTION

According to a first aspect of the invention, broadly speaking there is provided an automobile comprising a boot lid and a panel having an exterior surface, which is exposed to the outside environment when the boot lid is open and an opposite interior surface; wherein a rotatable shaft extends through the panel from the interior to the exterior, the rotatable shaft being operably connected to the boot lid on the exterior side and operably connected to a drive mechanism on the interior side, so as to transmit drive from the interior to the exterior.

By providing a rotatable shaft extending through a panel from the interior to the exterior of the vehicle, the drive mechanism is separated from the exterior of the vehicle. This can provide numerous benefits. In particular, any noise created by the drive mechanism is reduced and the drive mechanism is less susceptible to ingress of dirt/dust/water. This in turn has a dual benefit, in that dirt etc. does not damage the drive mechanism, nor should it build up on the drive mechanism and get transferred to items that are put into the boot. The use of a rotatable shaft extending through the panel, rather than having a reciprocating shaft moving from one side of the panel to the other helps impede transfer of dirt/grease between the interior and the exterior.

The rotatable shaft may be mounted to the panel via a bearing, for example jounalled to the inner ring of a rolling bearing, such as a ball bearing. The bearing may be provided with a seal.

A support bracket may be provided to support the rotatable shaft and the bearing may be provided in a support bracket fixed to the panel.

The drive mechanism may comprise an actuator, for example a linear actuator such as a powered strut, especially a spindle drive. Alternatively, the actuator may be a hydraulic or pneumatic cylinder.

The drive mechanism may comprise a parallel spindle drive, in which a motor which drives the extension of a rod from a sleeve is mounted parallel to the rod and the sleeve.

The drive mechanism may comprise a biasing member arranged to provide an additional biasing force to assist in lifting the boot lid.

The drive mechanism may be connected to the rotatable shaft by a first arm. The first arm may comprise a crank arm.

The actuator may be mounted at a fixed end to a part of the vehicle and mounted at a movable end to the first arm. Where the actuator comprises a motor, e.g in a spindle drive, especially a parallel spindle drive, the motor may be mounted at the movable end.

The rotatable shaft may be connected to the boot lid by a second arm, the second arm may comprise a lever arm.

The second arm may be mounted at an obtuse angle relative to the first arm.

The second arm (the lever arm) may be connected to the boot lid by a third arm, which may comprise a link arm. The link arm may be rotatably mounted at one end of the lever arm remote from the crank arm. The link arm may be shorter than the first arm and/or the second arm. The link arm may be no more than half as long as the first arm and/or the second arm.

The third arm may be mounted at an acute angle relative to the second arm.

The boot lid may be pivotally mounted to the third arm, or the second arm.

The second arm may extend forward from the rotatable shaft towards the pivot.

The rotatable shaft may comprise splines which mesh with grooves which may be provided in the first arm and/or the second arm.

The exterior surface of the panel may be also exposed to the outside environment when the bootlid is closed. For example, the exterior surface may be provided beneath a panel gap and the panel may form part of a drain channel. The panel may be the side panel of a drain channel.

The drain channel may be U-shaped, and may have an outboard panel and an inboard panel, with a drain surface extending therebetween. The rotatable shaft may extend through the outboard panel, from the interior, outboard of the drain channel, to the exterior, inboard of the outboard panel.

The boot lid may be mounted to the vehicle by at least one hinge, such that when the boot lid is opened, the boot lid rotates in the opposite direction to the direction of rotation of the rotatable shaft.

The automobile may comprise two panels each having an exterior surface, which is exposed to the outside environment when the boot lid is open and an opposite interior surface and two rotatable shafts, wherein a shaft extends through each respective panel from the interior to the exterior, each shaft being operably connected to the boot lid on the exterior side and operably connected to a drive mechanism on the interior side.

The panels may be provided substantially symmetrically about the longitudinal centreline of the automobile. Each of the optional features discussed above may apply to both panels, crankshafts and drive mechanisms.

DETAILED DESCRIPTION OF THE INVENTION

In order that the invention may be more clearly understood, an embodiment thereof will now be described, by way of example only, with reference to the accompanying drawings, of which:

Figure 1:
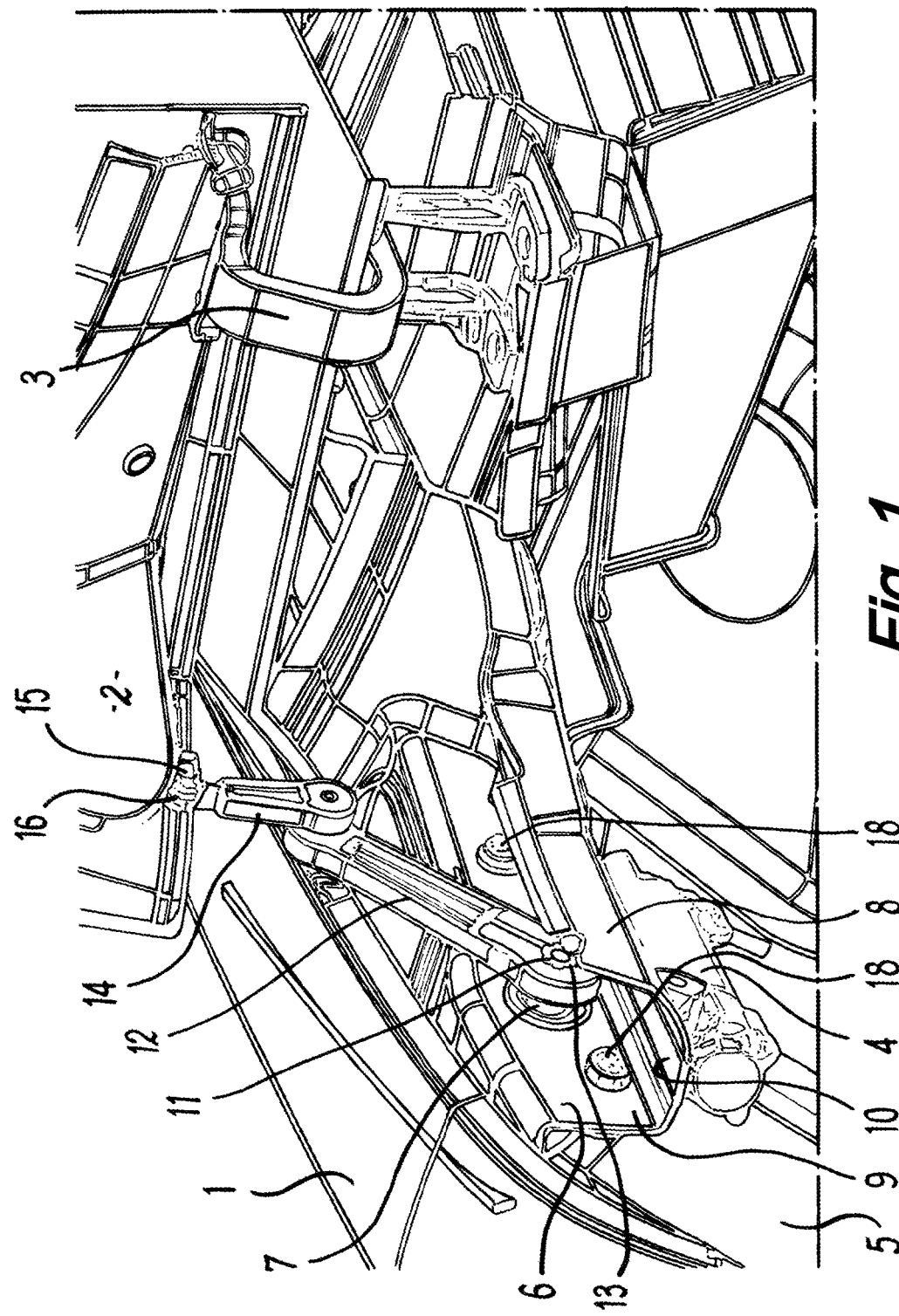
FIG. 1 shows a part cut-away rear isometric view of part of the rear left hand corner of an automobile according to the invention, in which the boot lid is shown in an open position.
Figure 3:
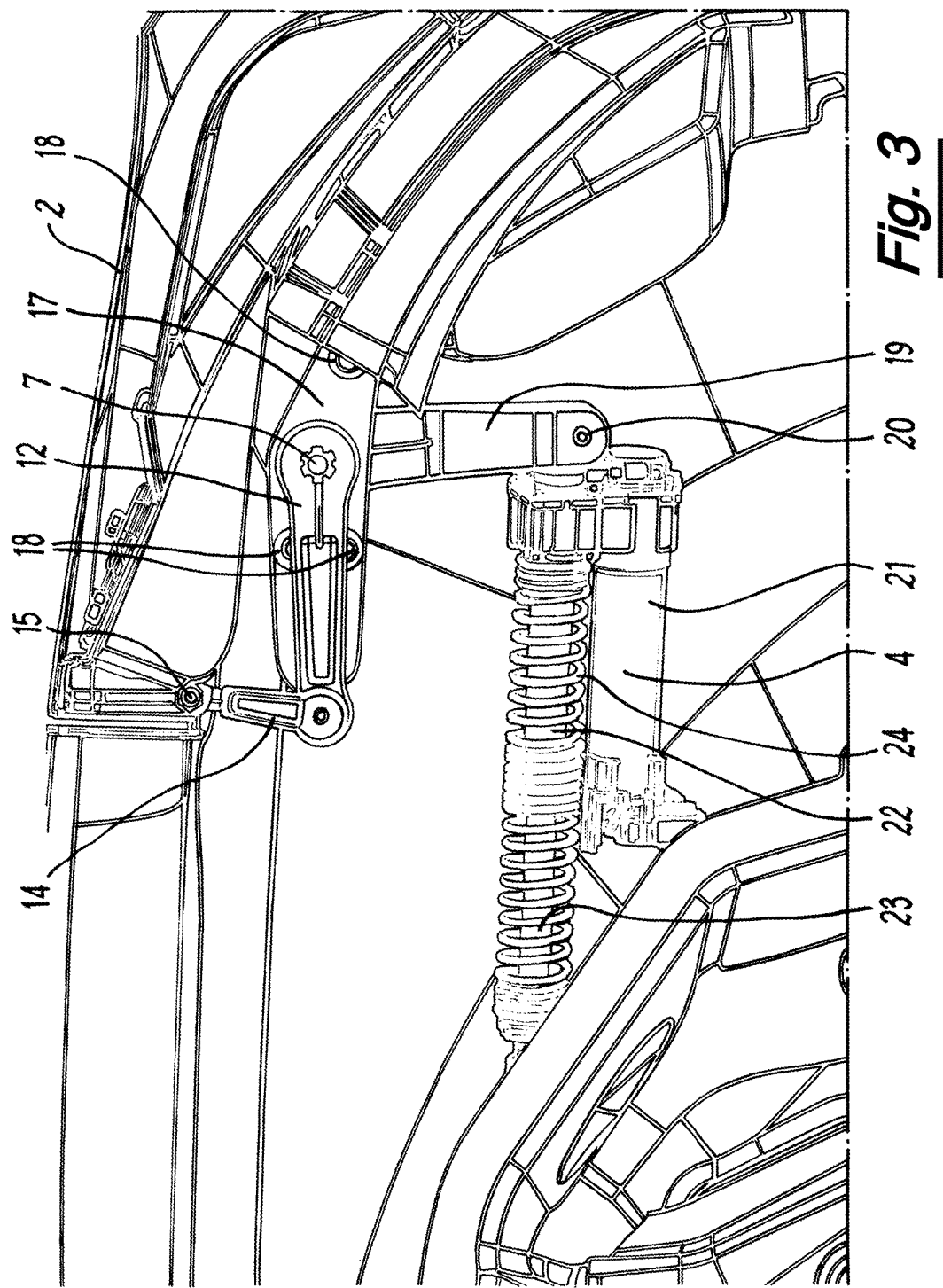
FIG. 3 shows a part cut-away lateral cross sectional view of the right hand side of the automobile of FIGS. 1 and 2 with the boot lid in the closed position.
Figure 4:
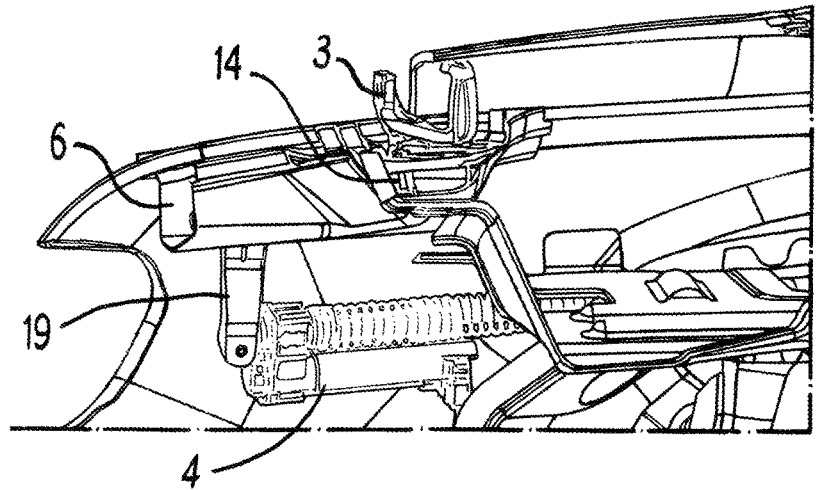
FIG. 4 shows a part cut away lateral cross sectional view of the left hand side of the automobile of FIGS. 1 to 3 with the boot lid opening mechanism arranged such that the boot lid would be in the closed position, but with the boot lid omitted from the drawing.
Figure 5:
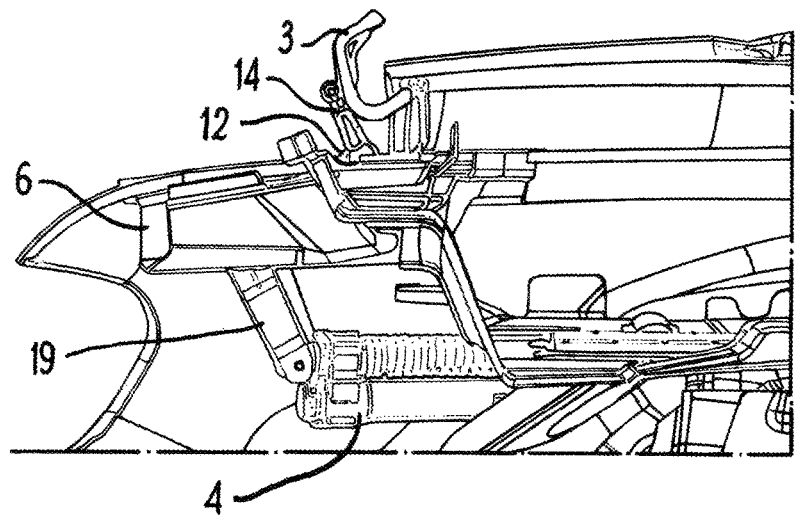
Figure 6:
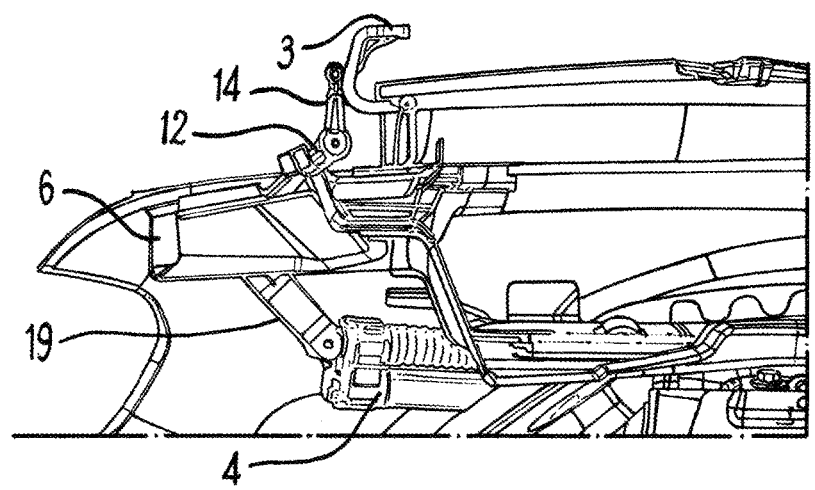

FIG. 5 shows a part cut away lateral cross sectional view of the left hand side of the automobile of FIGS. 1 to 4 with the boot lid opening mechanism arranged such that the boot lid would be in a partially open position, but with the boot lid omitted from the drawing; and FIG. 6 shows a part cut away lateral cross sectional view of the left hand side of the automobile of FIGS. 1 to 5 with the boot lid opening mechanism arranged such that the boot lid would be in the open position, but with the boot lid omitted from the drawing;

Referring to FIG. 1, an automobile 1 comprises a boot lid 2. The boot lid 2 is attached by hinges 3 (in this case goose neck hinges) to the body of the automobile 1 (only one hinge 3 is shown, positioned towards the left hand side of the boot lid 2, but a second hinge would also be provided, disposed in a similar position on the right hand side of the boot lid 2). Part of a drive mechanism 4 is shown, disposed laterally within the outer shell 5 of the automobile 1, but separated from the boot cavity 5 by a panel (not shown). Generally speaking the boot lid and the mechanism for opening and closing it is symmetrical about the longitudinal centreline of the automobile, so whilst only one mechanism is discussed below, it is discussed in relation to figures showing the mechanism on both the left hand side and right hand side of the automobile and it will be understood that normally, two such mechanisms are provided.

A drain channel 6 with a U-shaped cross section is located beneath the edge of the boot lid 2 which is adjacent the body of the automobile 1, to drain away water which enters the panel gap between the body panels and the boot lid 2. A rotatable shaft 7 extends through an aperture in the drain channel 6. The drain channel 6 extends from front to back on both sides of the automobile and on each side comprises an inboard upstanding side panel 8, an outboard upstanding side panel 9 and a drain surface 10 extending therebetween.

The outboard upstanding side panel 9 has an exterior surface (visible in FIG. 1) which defines one side of the channel and is exposed to the outside environment when the boot lid is open; the "wet side". The exterior surface is also exposed to the outside atmosphere when the boot lid is closed, in the sense that air/water from outside the vehicle can pass through a panel gap between the body and the boot lid 2 to the exterior surface of the outboard side panel. The opposite surface of the outboard upstanding side panel 9 is an interior surface, which is not exposed to the outside environment whether the boot lid is open or closed; the "dry side". The exterior surface of the outboard upstanding side panel 9 faces inboard, whereas the interior surface faces outboard, into a region of the interior of the vehicle body between the outer body shell and the boot cavity.

The exterior end of the shaft 7, which extends into the drain channel 6 and is exposed to the outside atmosphere, is provided with splines 11, in this example, 6 equally spaced splines are provided. The rotatable shaft 7 is arranged along the drain channel 6 towards the rear of the vehicle, and a lever arm 12 is connected to the exterior end of the rotatable shaft 7 via a grooved aperture 13, the grooves of which engage with the splines 11 on the shaft 7.

Figure 2:
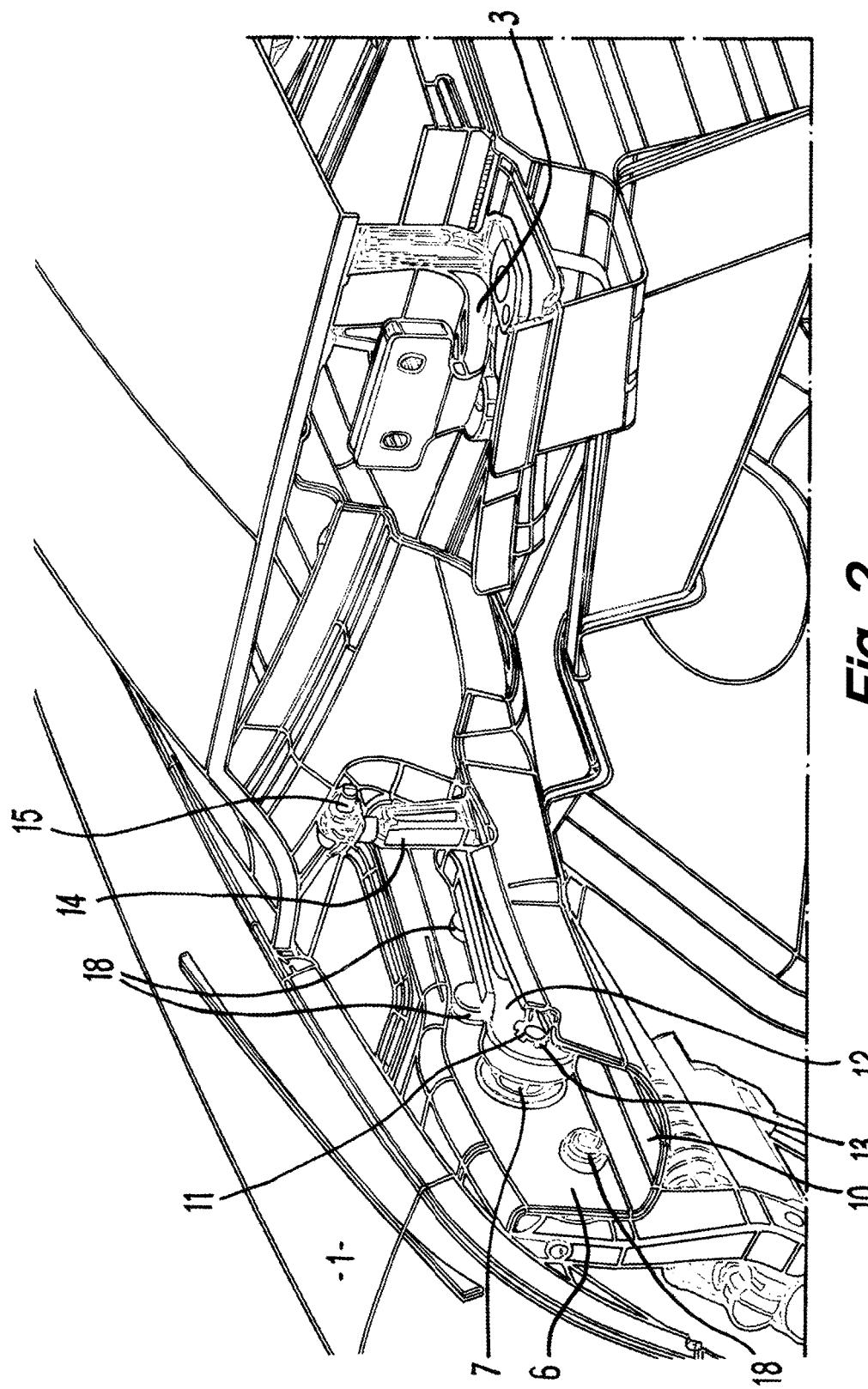
FIG. 2 shows a part cut-away rear isometric view of part of the rear left hand side of an automobile according to the invention with boot lid opening mechanism arranged such that the boot lid would be in the closed position, but with the boot lid omitted from the drawing.

The lever arm 12 is arranged to extend forward along the drain channel 6, such that, as shown in FIG. 2, when the boot lid 2 (not shown in FIG. 2) is closed, it extends along the drain channel beside the outboard side panel 9 and generally parallel to the drain surface 10. The front of the lever arm 12, remote from the shaft 7 is rotatably connected to a link arm 14, which is about half the length of the lever arm and the crank arm. A pin is provided in the lever arm 12 which extends inboard, into a bore in one end of the link arm 14, such that the link arm 14 can rotate around the pin relative to the lever arm 13. Of course, the link arm 14 could instead be provided with the pin, and the lever arm 13 with the bore, or indeed both the lever arm 13 and the link arm 14 could be provided with bores and a separate pin could connect them.

The opposite end of the link arm 14, remote from the lever arm 13 is provided with a pin 15 which pivotally connects the link arm 14 to a bracket 16 attached to the underside of the boot lid 2. With the boot lid 2 in the closed position (of FIG. 2), the link arm 14 extends substantially perpendicularly to the lever arm 12, but at a slight acute angle, e.g. 80 degrees, generally upwardly, up from the drain channel to the underside of the boot lid 2.

A support frame 17 seen best in FIG. 3 (in which part of the drain channel 6 is omitted) is attached to the interior surface of the outboard upstanding side panel 9 of each drain channel 6, via fastenings, in this example bolts 18. The support frame 17 is a thicker metal part having an aperture through which the rotatable shaft 7 extends and a pair of wings either side of the aperture, which extend alongside the outboard upstanding wall 9 and are attached at several places to the drain channel 6 to spread the load that is applied to the support frame 17. The support frame 17 includes a housing (not shown) into which the outer ring (not shown) of a bearing is attached, e.g. as an interference fit, the inner ring (not shown) being attached to the rotatable shaft 7, with rolling elements (not shown) radially spacing the outer ring from the inner ring.

The interior end of the rotatable shaft 7 is also provided with a plurality of, e.g. 6, splines (not shown, which engage with grooves (not shown) in an aperture (not shown) through a crank arm 19. The crank arm 19 extends generally perpendicularly to the lever arm 12, but at a slightly obtuse angle, e.g. 100 degrees, downward into the interior space between the interior surface of the outboard side panel 9 of the drain channel 6 and the body shell of the automobile 1. At the end of the crank arm 19, remote from the rotatable shaft 7, a pin 20 is provided, which extends in an outboard direction to pivotally connect the crank arm 19 to the drive mechanism 4.

The drive mechanism 4 of this embodiment is a parallel drive, in which a motor is mounted in a motor housing 21 parallel to a sleeve 22, so as to rotate the sleeve relative to a shaft 23, and thereby extend from and retract over the shaft 23, so as to act as a linear actuator. The sleeve 22 is attached at its end to the crank arm 19 via the pin 20 and, with the boot closed, extends forward, generally parallel to the lever arm 12. When the boot is closed, the sleeve 22 is fully extended relative to the shaft 23. The end of the shaft 23 remote from the pin 20 is pivotally mounted to a bracket fixed to part of the automobile, e.g. a wheel arch, such that retraction of the sleeve 23 over the shaft 23 moves the bottom end of the crank arm 19 forward. Springs 24 are attached between the opposite ends of the telescopic portion of the drive mechanism 4, extending around the shaft 23 and the sleeve 22, so as to provide a bias in the compression direction, to assist in the initial lifting of the boot lid 2.

With reference to FIGS. 4 to 6 the opening and closing of the boot lid 2 is explained. Once again, the boot lid itself is not shown in the images, but the movement of the gooseneck hinge can be followed. In the closed position shown in FIG. 4, the drive mechanism 4 is fully extended and the crank shaft 19 extends downwardly at a slight angle towards the rear of the automobile, with the lever arm hidden from view, extending along the drain channel 6. The short link arm 14 can be seen extending upwardly towards the front of the drain channel 6, roughly in line laterally with the rear of the gooseneck hinge.

In the closed position, which is adopted when the vehicle is driven, a top portion of the boot lid 2 is disposed generally horizontally (i.e. parallel to the surface on which the vehicle is parked), and a back portion, is disposed generally vertically (i.e. perpendicular to the surface on which the vehicle is parked).

To move from the closed configuration shown in FIG. 4 and to the open configuration shown in FIG. 6, the drive apparatus is driven (in response to an input via a button e.g. on an infrared fob which corresponds with the ECU of the vehicle), which causes the telescopic sleeve 22 to retract over the spindle 23. This linear action brings the end of the crank arm 19 forwards, thereby rotating the shaft 7 and hence transmitting torque to the lever arm 12, which traces an arc with its free end, in turn moving the link arm 14, upwards and rearwards, causing it to the boot lid upwards.

The acute angle of the link arm 14 relative to the lever arm 12 and the location of the connection between the link arm and the boot lid causes the motion transmitted to the boot lid 2 to apply a force in a suitable direction to aid the rotation of the goose neck hinge, although the direction of rotation of the rotatable shaft 7 is opposite to that of the hinge 3. Accordingly, in the initial rotation to a 45 degree angle shown in FIG. 5, the link arm 41 remains at substantially the same angle relative to the rotating lever arm 12.

As linear retraction of the drive mechanism 4 continues, the crank arm 19 is pulled further forward and slightly upward, to reach the fully open position shown in FIG. 6. Because of the obtuse angle relative to the lever arm, the initial movement was forwards and slightly downwards, before moving slightly upward. This motion continues to transmit torque through the rotating shaft 7, lifting the end of the lever arm 12 remote from the shaft, such that it follows an arc upward and rearward. With the lever arm tracing a rearward arc as the boot lid follows the arc of the gooseneck hinge, which at the end of the travel moves forward, the link arm 14 rotates forward in relation to the lever arm 12 forming an obtuse angle and continuing to lift the boot lid 2 and push it forward around the arc defined by the gooseneck hinge.

Closing the boot follows the same process in reverse. Again an input (e.g. via a button) is provided which results in the linear drive mechanism 4 being powered and extending the telescopic sleeve 22, pushing the crank arm rearward, turning the spindle 7 in its bearing and lowering the lever arm and the link arm so as to lower the boot lid 2.

The above embodiment is described by way of example only. Many variations are possible without departing from the scope of the invention as defined in the appended claims.

The invention claimed is:

1. An automobile comprising a boot lid and a panel, the panel separating an exterior side and an interior side, and having an exterior surface facing inboard into a boot cavity and exposed to an environment outside of the automobile when the boot lid is open and an opposite interior surface facing outboard into a region of the automobile body between an outer body shell and the boot cavity, wherein a rotatable shaft extends through the panel from the interior side to the exterior side and is mounted to the panel via a bearing, the rotatable shaft being operably connected to the boot lid on the exterior side and operably connected to a drive mechanism on the interior side, so as to transmit drive from the interior side to the exterior side, in order to move the boot lid between a closed position and an open position; wherein the drive mechanism on the interior side comprises a linear actuator.

2. An automobile according to claim 1 wherein the bearing comprises a seal.

3. An automobile according to claim 1 wherein the bearing is provided in a support bracket fixed to the panel.

4. An automobile according to claim 1 wherein the linear actuator is a spindle drive, a hydraulic cylinder or a pneumatic cylinder.

5. An automobile according to claim 1 wherein the drive mechanism is connected to the rotatable shaft by a first arm.

6. An automobile according to claim 5 wherein the rotatable shaft is connected to the boot lid by a second arm.

7. An automobile according to claim 6 wherein the second arm is mounted at an obtuse angle relative to the first arm.

8. An automobile according to claim 6 wherein the second arm is connected to the boot lid by a third arm.

9. An automobile according to claim 8 wherein the third arm is mounted at an acute angle relative to the second arm.

10. An automobile according to claim 9 wherein the third arm is rotatably mounted at one end of the second arm remote from the first arm.

11. An automobile according to claim 6 wherein the boot lid is pivotally mounted to the third arm, or the second arm and the second arm extends forward from the rotatable shaft towards the pivot.

12. An automobile according to claim 1 wherein the rotatable shaft comprises splines.

13. An automobile according to claim 1 wherein the exterior surface of the panel is also exposed to the environment outside of the automobile when the boot lid is closed.

14. An automobile according to claim 1 wherein the panel is a side panel of a drain channel.

15. An automobile according to claim 14 wherein the drain channel comprises an outboard panel and an inboard panel, with a drain surface extending therebetween; wherein the rotatable shaft extends through the outboard panel, from the interior side, outboard of the drain channel, to the exterior side, inboard of the outboard panel.

16. An automobile according to claim 1 wherein the boot lid is mounted to the vehicle by at least one hinge such that when the boot lid is opened, the boot lid rotates in a direction opposite to a direction of rotation of the rotatable shaft.

17. An automobile according to claim 1 comprising a further panels separating an exterior side and an interior side, and having an exterior surface facing inboard into the boot cavity, exposed to the environment outside of the automobile when the boot lid is open and an opposite interior surface facing outboard into a region of the automobile body between the outer body shell and the boot cavity and a further rotatable shaft, wherein the further shaft extends through the further panel from the interior side to the exterior side, the further shaft being operably connected to the boot lid on the exterior side and operably connected to a further drive mechanism on the interior side.

18. An automobile comprising a boot lid and a panel, the panel separating an exterior side and an interior side and having an exterior surface facing inboard into a boot cavity and exposed to an environment outside of the automobile when the boot lid is open and an opposite interior surface facing outboard into a region of the automobile body between an outer body shell and the boot cavity, wherein a rotatable shaft extends through the panel from the interior side to the exterior side and is mounted to the panel via a bearing, the rotatable shaft being operably connected to the boot lid on the exterior side and operably connected to a drive mechanism on the interior side, so as to transmit drive from the interior side to the exterior side, in order to move the boot lid between a closed position and an open position; wherein the drive mechanism on the interior side comprises a linear actuator and a biasing member, the biasing member arranged to provide a biasing force additional to the force provided by the linear actuator to assist in lifting the boot lid.

19. An automobile comprising a boot lid and a panel, the panel separating an exterior side and an interior side and having an exterior surface facing inboard into a boot cavity and exposed to an environment outside of the automobile when the boot lid is open and an opposite interior surface facing outboard into a region of the automobile body between an outer body shell and the boot cavity, wherein a rotatable shaft extends through the panel from the interior side to the exterior side and is mounted to the panel via a bearing, the rotatable shaft being operably connected to the boot lid on the exterior side and operably connected to a drive mechanism on the interior side, so as to transmit drive from the interior side to the exterior side, in order to move the boot lid between a closed position and an open position; wherein the drive mechanism is connected to the rotatable shaft by a first arm; wherein the drive mechanism comprises a parallel spindle drive, in which a motor, which drives the extension of a rod from a sleeve, is mounted parallel to the rod and the sleeve.

20. An automobile according to claim 19 wherein the parallel spindle drive is mounted fixedly at one end of the drive to a part of the vehicle and mounted at a movable end to the first arm and wherein the motor is mounted at the movable end.

* * * * *